United States Patent
De Freitas

(10) Patent No.: US 6,962,351 B2
(45) Date of Patent: Nov. 8, 2005

(54) HOUSING FOR RETAINING A SEALING CAP ON A BALL AND SOCKET JOINT

(75) Inventor: Ademilson Vlademir De Freitas, Sao Bernardo Do Campo (BR)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/445,299

(22) Filed: May 27, 2003

(65) Prior Publication Data

US 2003/0223806 A1 Dec. 4, 2003

(51) Int. Cl.[7] ................................................. F16J 15/32
(52) U.S. Cl. ........................ 277/634; 277/635; 277/637; 277/641; 403/137
(58) Field of Search ................................ 277/634, 635, 277/636, 637, 641, 642; 403/134, 137

(56) References Cited

U.S. PATENT DOCUMENTS

| | | | |
|---|---|---|---|
| 2,559,857 A | * 7/1951 | Edwards | 403/134 |
| 5,267,805 A | * 12/1993 | Ueno et al. | 403/134 |
| 6,287,040 B1 | * 9/2001 | Fischer | 403/137 |
| 6,350,075 B1 | * 2/2002 | Abels | 403/134 |
| 6,652,179 B2 | * 11/2003 | De Freitas | 403/134 |

* cited by examiner

Primary Examiner—Enoch Peavey
(74) Attorney, Agent, or Firm—Liniak, Berenato & White

(57) ABSTRACT

A ball and socket joint assembly having a cylindrical sealing cap (1) housing (6, 6A) connected to the external case (4) of the joint assembly. The housing (6, 6A) may be comprised of plastic, aluminum, rubber, or other malleable material. The housing (6, 6A) has a ring shape, with a groove molded into the housing's external surface for receiving the larger diameter end of a sealing cap (1), the smaller diameter end of the sealing cap (1) is directly attached to the shaft of the ball and socket joint's spherical pin (2). The preferred embodiment of the housing (6) has a general "L" shape, and an alternative embodiment (6A) has a more linear shape. The sealing cap (1) ensures that the ball and socket are not contaminated during operation of the joint assembly. The ball and socket joint of the invention is primarily designed for motor vehicle applications, specifically, in automotive steering and suspension systems.

11 Claims, 2 Drawing Sheets

HOUSING FOR RETAINING A SEALING CAP ON A BALL AND SOCKET JOINT

CROSS REFERENCE TO RELATED APPLICATIONS

This application claims priority to, and incorporates by reference, Brazilian Patent Application No. PI0202048-3 filed by Dana Industrial Ltd., an affiliate of Dana Corporation, on May 27, 2002.

BACKGROUND OF THE INVENTION

1. Field of the Invention

The invention generally relates to ball and socket joints. Specifically, the invention relates to a housing for retaining a sealing cap on a ball and socket joint.

2. Description of the Background Art

A typical prior art ball-and-socket joint comprises a spherical pin, with the ball portion of the assembly enclosed by an external case. A spherical pin is generally comprised of a single ball fixedly attached to one end of a shaft. A ball and socket joint assembly, correctly mounted, has a first fastening system on the external case, and a second fastening system at the opposite exposed end of the spherical pin assembly. Once the external case is attached to a movable part, and the spherical pin exposed end is attached to a separate part, the joint provides angular rotary movement between the respective parts. These types of joints are commonly used on vehicle steering and suspension systems. Depending on the specific application, the case and spherical pin may have different operational characteristics required to facilitate the specific function of the joint.

In operation, the ball and socket joint allows the swiveling movement of the spherical pin, while simultaneously restricting the pin's angular movement, so that the force generated between the external case attachment point and the pin's exposed end attachment point, is communicated along the pin's longitudinal axis, as required in a functional tie rod or steering rod system.

The ball and socket joint is comprised of a spherical pin encased in an external case, with an aperture permitting the non-spherical portion (the pin shaft) of the spherical pin to extend from the external case. A sealing cap is attached to both the external case and the shaft of the spherical pin. The sealing cap is designed to prevent contamination of the joint by impurities. Joint contamination results in premature wear and failure, as well as other operational characteristics that make the joint unpredictable and unreliable.

In the prior art, the sealing cap connects with the external case at a groove that is machined into the case. However, machining the groove is expensive and time consuming, and the machined cuttings and residue from the manufacturing process can contaminate the joint.

In order to eliminate these deficiencies, the present invention has been developed. The invention may be used in any system, but is designed primarily for protecting a joint between a rotary element, and a fixed support in an automotive application. In operation, the invention functions to ensure that a ball and socket joint are always protected from contamination, while minimizing the joint's manufacturing expense.

SUMMARY OF THE INVENTION

The invention comprises a housing for retaining a sealing cap on the external case of a ball and socket assembly. The housing is made of injected plastic, aluminum, rubber, or other malleable material. The housing has a ring shape, with a channel molded into the housing's external surface for receiving the larger diameter end of a sealing cap. The smaller diameter end of the sealing cap is attached to the shaft of a spherical pin. The sealing cap ensures that the ball and socket are not contaminated during operation of the joint assembly.

The preferred embodiment of the housing has a general "L" shape. An alternative embodiment of the housing has a more linear shape, and does not have an angular component.

The present invention is a relatively simple component of a ball and socket sealing mechanism that lowers manufacturing costs, and improves ball and socket joint reliability and wear characteristics. The ball and socket-type joint is primarily designed for motor vehicle applications, specifically, in automotive steering and suspension systems.

DETAILED DESCRIPTION OF THE INVENTION

An embodiment of the present invention will now be described with reference to the accompanying drawing. It should be noted that the terms "front", "rear", "left", "right", "upper", and "lower", relate to directions as viewed in FIG. 1, but may not be applicable to the invention when installed in a specific application.

Figure 1:
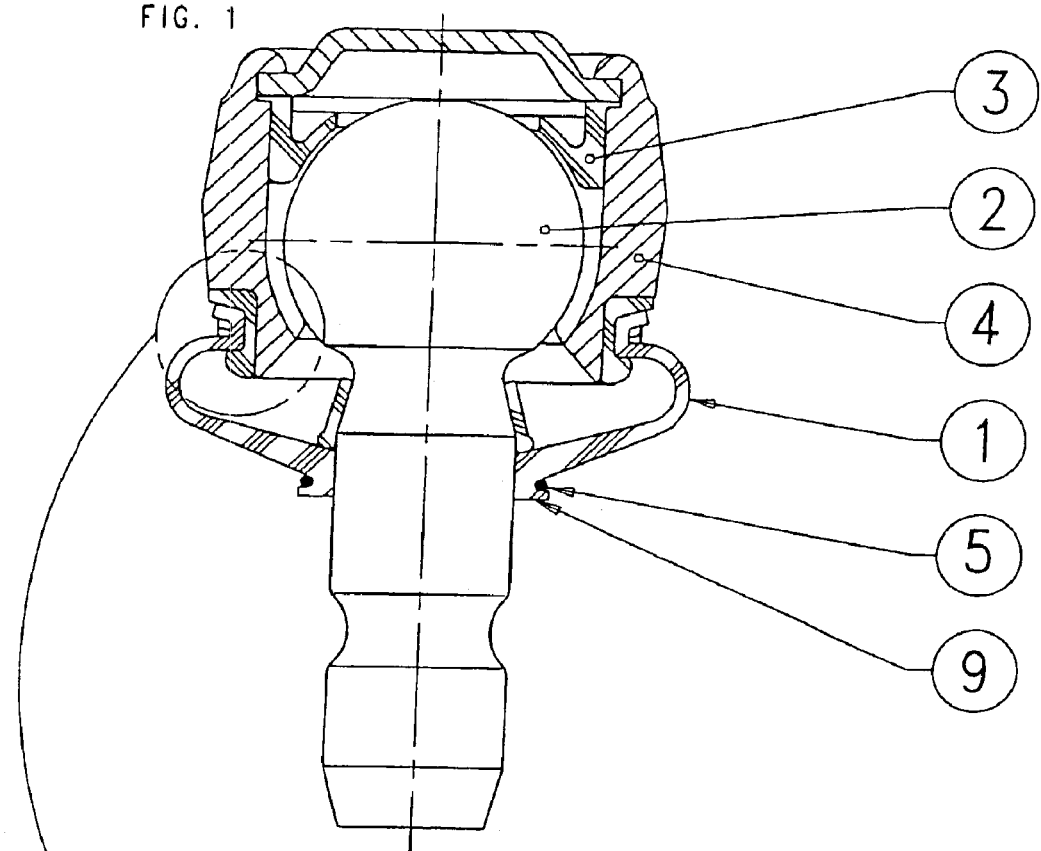
FIG. 1 is a partial sectional view of the present invention, exposing the spherical pin of the ball and socket joint.

As seen in FIG. 1, the ball-and-socket joint is comprised of a spherical pin 2, with an encased end, and an opposite exposed end designed for connection to a moveable support component (not shown). The encased end of the spherical pin 2 is mounted adjacent to a bearing assembly 3, and the combination spherical pin 2 and bearing assembly 3 is enclosed by an external case 4. The non-enclosed (exposed) end of the spherical pin 2 extends out of the case 4, so that the exposed end of the spherical pin 2 may be fixed to a moveable support component, the joint thereby restricting the component's angular and free rotary movement.

A cylindrical sealing cap 1 comprised of elastomeric material has an upper portion with a larger diameter, and a lower portion with a smaller diameter. At its upper end, the larger diameter end of the sealing cap 1 attaches to the external case 4, with an elastic ring 8. The elastic ring 8 and the sealing cap upper lip 7, fit into a groove in a housing 6 that seals the sealing cap 1 to the external case 4. The housing 6 has a ring shape and is comprised of plastic, aluminum, rubber, fiberglass, epoxy, or other malleable material that may be directly joined to a forged or stamped section of the external case 4, with no machining of the external case 4 required. At the sealing cap's 1 lower end, the sealing cap 1 is attached to the spherical pin 2 by a lower ring 5 that is mounted adjacent to the lower opening 9 in the sealing cap 1.

Figure 2:
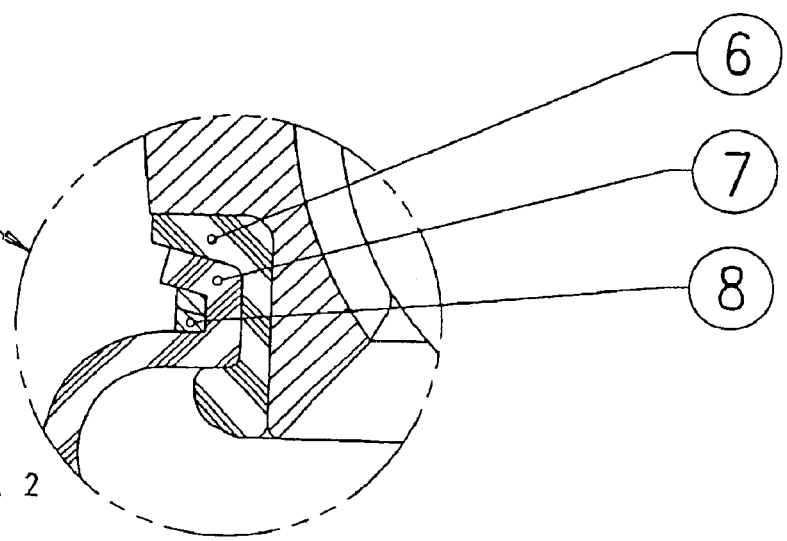
FIG. 2 is an expanded view of the sealing cap connection with the spherical pin, as shown in FIG. 1.

FIG. 2 is an expanded view of the connection between the sealing cap 1 and the external case 4. Specifically, FIG. 2 illustrates the connection between the external case 4, the housing 6, the upper lip 7 of the sealing cap 9, and the elastic ring 8. FIG. 2 generally discloses the substance of the preferred embodiment of the invention, wherein the housing 6 has a general "L" shape.

Figure 3:
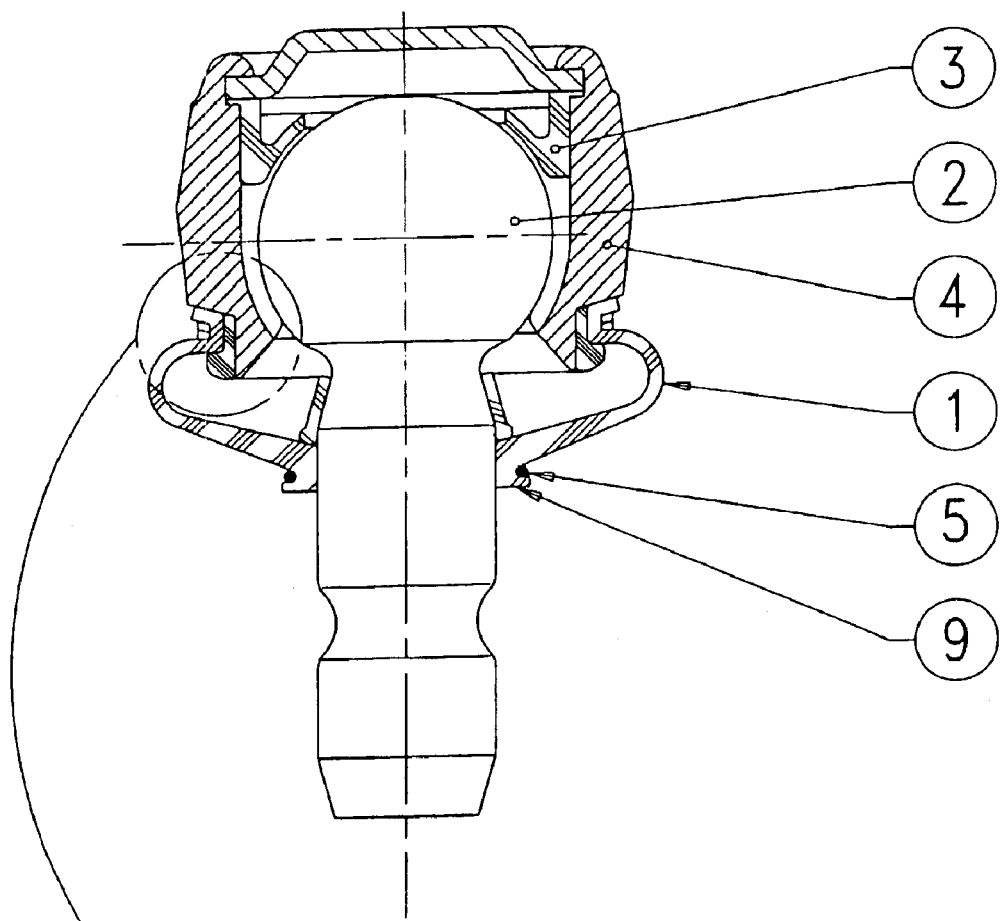
FIG. 3 is a partial sectional view of a second embodiment of the present invention, exposing the spherical pin of the ball-and-socket joint.

FIG. 3 discloses an embodiment of the invention similar to FIG. 1, however, the connection between the sealing cap 1 and the external case 4 is modified in FIG. 3.

Figure 4:
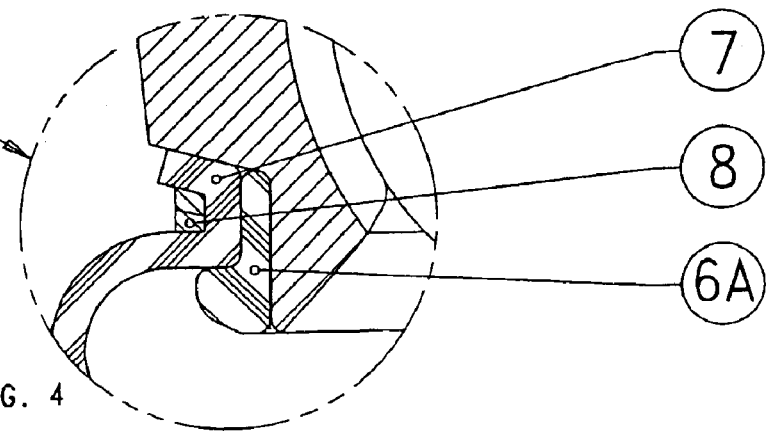
FIG. 4 is an expanded view of a second embodiment of the sealing cap connection with the spherical pin, as shown in FIG. 3.

As most clearly illustrated in FIG. 4, the housing 6A has a more linear shape than the housing 6 disclosed in FIGS. 1 and 2. Additionally, in the second embodiment shown in FIGS. 3 and 4, the sealing cap's 1 upper lip 7 fits adjacent to the lower end of the external case 4. Further, the lower end of the external case 4 has a slightly different angle than in the first embodiment.

For the foregoing reasons, it is clear that the invention provides a housing 6, 6A, for retaining a sealing cap 1 on the external case 4 of a ball and socket assembly. The housing 6, 6A, being comprised of plastic, aluminum, rubber, or other malleable material, and having a ring shape, with a groove molded into the housing's 6, 6A, external surface for receiving the larger diameter end of a sealing cap 1. The first embodiment of the housing 6, 6A, having a general "L" shaped cross section, and the second embodiment having a more linear shaped cross section. The invention provides a low cost ball and socket joint with superior wear and reliability characteristics.

The invention, as described, may be modified in multiple ways and applied in various technological applications. For example, in addition to automotive applications, the ball-and-socket joint may be used in nautical and aeronautical applications as well. Similarly, although the materials of construction are generally described, they may also include a variety of compositions consistent with the function of the invention. Such variations are not to be regarded as a departure from the spirit and scope of the invention, and all such modifications as would be obvious to one skilled in the art are intended to be included within the scope of the following claims.

I claim:

1. A ball and socket joint, comprising:
   (a) a spherical pin, having a spherical end rotably coupled to a bearing assembly,
   (b) said spherical end and said bearing assembly being enclosed in a case,
   (c) a cylindrical sealing cap comprised of elastomeric material, having a first end connected to said case, and a second end connected to said spherical pin,
   (d) said sealing cap first end having a sealing assembly for connecting said sealing cap to said case, said sealing assembly comprising an elastic retaining ring retaining a sealing cap against a housing that abuts said case,
   wherein said sealing assembly maintains a separation between said sealing cap and said case such that said sealing cap does not contact said case.

2. The ball and socket joint of claim 1, wherein said first end of said sealing cap has a larger diameter than said second end of said sealing cap.

3. The ball and socket joint of claim 2, wherein said sealing cap has an intermediate point between said first end and said second end, said intermediate point having a diameter larger than the diameter of said sealing cap at said first or said second ends.

4. The ball and socket joint of claim 1, wherein said case having been formed by a forging or stamping process, and said case having no machined surfaces.

5. The ball and socket joint of claim 1, wherein said sealing assembly is comprised of said elastic retaining ring, retaining said sealing cap adjacent a sealing cap lip against said housing.

6. The ball and socket joint of claim 5, wherein said housing is comprised of plastic, aluminum, rubber, or other malleable material.

7. A ball and socket joint comprising:
   (a) a spherical pin, having a spherical end rotably coupled to a bearing assembly,
   (b) said spherical end and said bearing assembly being enclosed in a case,
   (c) a cylindrical sealing cap comprised of elastomeric material, having a first end connected to said case, and a second end connected to said spherical pin,
   (d) said sealing cap first end having a sealing assembly for connecting said sealing cap to said case, said sealing assembly is comprised of an elastic retaining ring, a sealing cap lip and a house,
   wherein said sealing assembly maintains a separation between said sealing cap and said case such that said sealing cap does not contact said case; and
   wherein and said housing has an "L" shaped cross section, and is disposed between said sealing cap lip and said case.

8. The ball and socket joint of claim 5, wherein said sealing cap lip has a "U" shape.

9. A joint, comprising:
   (a) a spherical pin, having a spherical end rotably coupled to a bearing assembly,
   (b) said spherical end and said bearing assembly being enclosed in a case,
   (c) a cylindrical sealing cap comprised of elastomeric material, having a first end connected to said case, and a second end connected to said spherical pin,
   (d) said sealing cap first end having a sealing assembly for connecting said sealing cap to said case,
   (e) said first end of said sealing cap having a larger diameter than said second end of said sealing cap,
   (f) said sealing cap having an intermediate point between said first end and said second end, said intermediate point having a diameter larger than the diameter of said sealing cap at said first or said second ends,
   (g) said case being forged or stamped, and containing no machined surfaces,
   (h) said sealing assembly comprising of an elastic retaining ring retaining, a sealing cap lip of said sealing cap against a housing that abuts said case,
   (i) said housing comprised of plastic, aluminum, rubber, or other malleable material,
   wherein said sealing assembly maintains a separation between said sealing cap and said case such that said sealing cap does not contact said case.

10. A joint, comprising:
    (a) a spherical pin, having a spherical end rotably coupled to a bearing assembly,
    (b) said spherical end and said bearing assembly being enclosed in a case,
    (c) a cylindrical sealing cap comprised of elastomeric material, having a first end connected to said case, and a second end connected to said spherical pin, (d) said sealing cap first end having a sealing assembly for connecting said sealing cap to said case, (e) said first end of said sealing cap having a larger diameter than said second end of said sealing cap, (f) said sealing cap having an intermediate point between said first end and said second end, said intermediate point having a diameter larger than the diameter of said sealing cap at said first or said second ends, (g) said case being forged or stamped, and containing no machined surfaces, (h) said sealing assembly comprising of an elastic retaining ring, a sealing cap lip and a housing, (i) said housing comprised of plastic, aluminum, rubber, or other malleable material, wherein said sealing assembly maintains a separation between said sealing cap and said case such that said sealing cap does not contact said case, wherein and said housing has an "L" shaped cross section, and said housing is disposed between said sealing cap lip and said case.

11. The joint of claim 9, wherein said sealing cap lip has a "U" shape.

* * * * *